Patented May 31, 1938

2,118,915

UNITED STATES PATENT OFFICE 2,118,915

MANUFACTURE OF WAX ACIDS

Richard James Butz and Robert Charles Cantelo, Whiting, Ind., assignors to Sinclair Refining Company, New York, N. Y., a corporation of Maine No Drawing. Application September 30, 1936, Serial No. 103,367

3 Claims. (Cl. 260—116)

This invention relates to improvements in the manufacture of so-called "wax acids", the organic acids produced by oxidation of paraffin wax having acid numbers approximating 120 or higher, saponification numbers approximating 130 or higher and molecular weights in the general neighborhood of 400. The invention is of special value in the manufacture of wax acids for compounding, as aluminum salts of the wax acids, with petroleum lubricating oils to lower the pour point of such oils as described in an application filed June 11, 1935, Serial Number 26,038 by Edwin J. Barth and Ralph P. Corlew.

According to this invention, such wax acids are prepared by blowing air through paraffin wax of melting point approximating 130°–132° F. at a rate ranging from 0.5 to 10.0 cubic feet per hour per pound of wax mixture while maintaining a temperature of 220°–250° F., stopping the oxidation before the acid number and saponification number of the wax mixture exceeds 70 and 125, respectively, and separating the wax acids from the wax mixture. Separation of the wax acids from the wax mixture can be effected in any convenient manner, by saponification and separation of the resulting soap or by extraction with an appropriate solvent such as isopropyl alcohol for example. A blowing rate approximating 2 cubic feet per hour per pound of wax mixture is particularly advantageous. The yield of wax acids is improved by blowing the wax while maintaining a temperature approximating 250° F. until the saponification number of the wax mixture approximates 40–50 and then reducing the temperature to about 230° F. and continuing the blowing at this lower temperature, the temperature being reduced either in a single step or in several steps.

The following examples will illustrate the practice of the invention:

Example I

2½ kilograms of paraffin wax having a melting point of 130°–132° F. and 37.5 grams of stearic acid are charged into a steam jacketed steel pot equipped with a paddle type stirrer. Air is blown through the charge in the pot at a rate of about 11 cubic feet per hour while maintaining a temperature of 250° F., the mixture in the pot being vigorously agitated throughout the blowing, care being taken to limit the agitation to a degree avoiding the formation of an air emulsion with the wax mixture. The blowing is continued until the acid number and saponification number of the mixture reaches 37 and 79.3, respectively. The wax acids are then saponified by heating for 1 hour at 172° F. with a 20° Baumé aqueous solution of sodium hydroxide in proportion containing about that amount of sodium hydroxide theoretically required to react with the wax acids and the temperature of the mixture is then raised to 190° F. and maintained at 190° F. for 30 minutes. The resulting mixture including the sodium salts of the wax acids is diluted with five times its volume of water, sufficient acetone or other suitable organic solvent is added to resolve the resulting emulsion, and the aqueous soap solution is separated by decantation from the supernatant layer of unsaponifiable matter.

Example II

The operation is the same as that described in Example I, except that the blowing is continued until the acid number and saponification number of the wax mixture reach 45.5 and 92, respectively. A somewhat higher yield of wax acids somewhat more effective in the form of aluminum salts as pour depressors is obtained.

Example III

2½ kilograms of paraffin wax having a melting point of 130°–132° F. and 37.5 grams of stearic acid are charged into a steam jacketed steel pot equipped with a paddle type stirrer. Air is blown through the charge in the pot while maintaining a temperature of 250° F. until the saponification number of the wax mixture reaches 43.5, the temperature is then reduced to about 230° F. and the blowing is continued at this lower temperature until the acid number and saponification number reach 54.4 and 103, respectively. The wax acids produced are separated by saponification with sodium hydroxide as in the first example. A yield of wax acids somewhat higher than that obtained in the second example is obtained, these wax acids being about as effective, in the form of aluminum salts, as pour depressors as those obtained in the first example.

The pour depressors described in said prior application Serial No. 26,038 can be prepared by converting the sodium salts of the wax acids produced as described in the foregoing examples to aluminum salts of these wax acids by reaction with an appropriate aluminum salt, coagulation, separation, washing, drying and extraction with benzol as described in that prior application. The wax acids produced as described herein are of special value in the manufacture of such pour depressors. For example, blowing rates substantially higher than those specified tend to produce wax acids which in the form of aluminum salts are less effective as pour depressors and the oxidation carried to a point such that the specified acid number and saponification number limits are substantially exceeded tends to produce wax acids which in the form of aluminum salts are less effective as pour depressors. The aluminum salts of the wax acids prepared as described in the foregoing examples were effective, severally, to reduce the pour test of a Pennsylvania lubricating oil originally having a pour test of 25° F. to −10° F. or lower added in amounts of 0.5% (by weight) on the oil.

The addition of stearic acid to the charge of paraffin wax subjected to oxidation as in the foregoing examples is not essential but does facilitate the progress of the oxidation.

We claim:

1. In the manufacture of wax acids, the improvement which comprises blowing air through paraffin wax of melting point approximating 130°–132° F. at a rate of 0.5–10 cubic feet per hour per pound of wax mixture while maintaining a temperature of 220°–250° F., stopping the oxidation before the acid number and saponification number of the wax mixture exceed 70 and 125, respectively, and separating the wax acids from the wax mixture.

2. In the manufacture of wax acids, the improvement which comprises blowing air through paraffin wax of melting point approximating 130°–132° F. at a rate approximating 2 cubic feet per hour per pound of wax mixture while maintaining a temperature of 220°–250° F., stopping the oxidation before the acid number and saponification number of the wax mixture exceed 70 and 125, respectively, and separating the wax acids from the wax mixture.

3. In the manufacture of wax acids, the improvement which comprises blowing air through paraffin wax of melting point approximating 130°–132° F. at a rate of 0.5–10 cubic feet per hour per pound of wax mixture while maintaining a temperature approximating 250° F. until the saponification number of the wax mixture approximates 40–50, reducing the temperature to about 230° F. and continuing the air blowing, stopping the oxidation before the acid number and saponification number of the wax mixture exceed 70 and 125, respectively, and separating the wax acids from the wax mixture.

ROBERT CHARLES CANTELO.
RICHARD JAMES BUTZ.